A. W. & J. SANGSTER.
Beer Cooler.
No. 63,947.
Patented April 16, 1867.
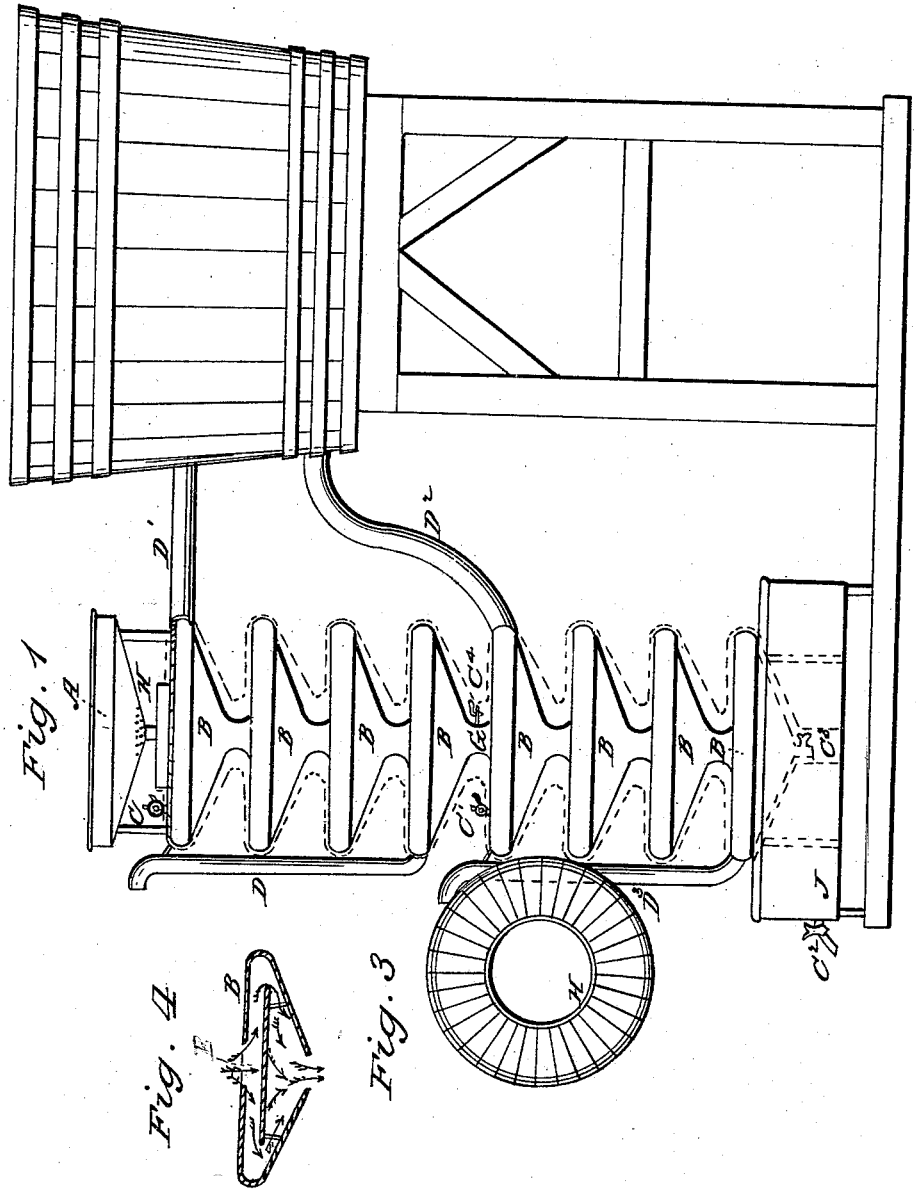

United States Patent Office.

AMOS W. AND JAMES SANGSTER, OF BUFFALO, NEW YORK.

Letters Patent No. 63,947, dated April 16, 1867.

IMPROVEMENT IN BEER COOLERS.

*The Schedule referred to in these Letters Patent and making part of the same.*

TO ALL WHOM IT MAY CONCERN:

Be it known that we, AMOS W. SANGSTER and JAMES SANGSTER, of the city of Buffalo, in the county of Erie, and State of New York, have invented certain new and useful improvements in Beer Coolers; and we do hereby declare that the following is a full and exact description thereof, reference being had to the accompanying drawings and to the letters of reference marked thereon.

The nature of our invention consists in the employment of cone-shaped vessels so arranged and combined that the cooling liquid flows on the inside from the upper to the lower part of each cone, or each subdivision of a series of said cones, while the beer or liquid to be cooled spreads over and flows downward, in the same direction as the cooling liquid, over the outside of a series of said cones; also in the employment of flat plates, or the equivalent thereof, on the inside of said cones, for the purpose of distributing the cooling liquid equally to the surfaces of the same.

To enable others skilled in the art to make and use our invention, we will proceed to describe its construction and operation.

We construct our cooler of copper, as being the most suitable material, although tin plate or sheet brass may be used. In said drawings—

Figure 1 represents a side elevation of a series of cones.

Figure 2 is a similar view of the tank or vessel from which they are supplied with cold water.

Figure 3 is a plan view of one of the cones, showing the upper part corrugated.

Figure 4 represents a section view, showing the interior arrangement of one of the cones by which the cooling liquid is directed against the surface of the same, instead of forming in a current in the centre and passing directly down without reaching all parts of the surface which it is necessary to keep cool.

A, in fig. 1, represents a basin into which the beer or liquid to be cooled is poured. It is perforated at the bottom, as shown, so as to act as a strainer. The cones are all marked B, and are connected together by double seaming or soldering, thus forming a series of cones as shown in the drawing. $D^1$ and $D^2$ are two pipes which supply the cold water for the cones or coolers. D and $D^3$ represent two tubes from which the cold water flows after passing through the cones. The dotted lines marked G represents a partition which divides said series of cones in two parts for the purpose of preventing the cooling liquid or water from flowing down into the lower part of the series. By this arrangement it is compelled to flow up and out of the tube D after having become partially warmed by the hot beer or other liquid flowing over the outside of the cones; this, of course, allows a fresh supply of cooling liquid to flow into the lower part of the series of cones through the tube $D^2$, which fills the cones and flows out through the tube $D^3$. We do not confine ourselves to one partition through a series of said cones, such as shown by the dotted lines at G, but claim that each cone may be partitioned off in a similar manner, and a fresh supply of cold water allowed to flow through each cone separately by providing each cone with tubes similar to those shown at D $D^3$ and $D^2$ $D^1$, or the equivalent thereof. C and $C^1$ represent stop-cocks for drawing off the air while the coolers or cones are being filled with water; they are closed after the cones are filled. $C^3$ and $C^4$ are stop-cocks for drawing off the water when necessary, which is often the case in cold weather, to prevent the freezing and bursting of the cones and tubes. In fig. 4, which is a section view of one of the cones, E represents a section of a circular plate of metal, upon which the water falls and spreads in its descent through the coolers. It causes the liquid to take nearly the direction shown by the arrows, which, of course, causes it to flow against and cool the inside of the cones. J represents a reservoir for receiving the beer after being cooled. $C^2$ is a stop-cock for drawing it off into casks or kegs. H represents the rim of a basin into which the beer flows from the pan and strainer A.

Our cooler is operated as follows: The stop-cocks C and $C^1$ are opened until the cones are filled with water, after which they are closed. The level of the tank or reservoir being higher than the cooler, a stream of cold water is kept circulating in a downward direction through the cones or coolers, as described, and up and out of the tubes D and $D^3$, thus keeping all the surfaces perfectly cool. The warm or hot beer is poured into the trough or basin A, through which it flows through the perforations shown, and then into the basin H, over which it flows and follows the direction of the dotted lines along and over the surface of the coolers until it reaches the reservoir J, from which it is drawn perfectly cool.

What we claim as our invention, and desire to secure by Letters Patent, is—

1. The cone-shaped coolers connected together as described; also in connection therewith of one or more partitions, as shown at G, or the equivalents thereof, for the purposes described and set forth.

2. In combination with the cone or cones we claim the tubes $D$ $D^3$ $D^1$ and $D^2$, substantially as herein described.

3. We claim the employment of a corrugated surface on the upper part of the cone, as shown in fig. 3, for the purpose of more equally distributing the liquid to be cooled as it flows over said surface 4. We claim the plate E, as and for the purposes described.

AMOS W. SANGSTER,
JAMES SANGSTER.

Witnesses:
S. M. SANGSTER,
E. REMINGTON.